Mar. 20, 1923. 1,448,950.
E. UECKER.
AUTOMATIC COUPLING FOR VEHICLES.
FILED OCT. 15, 1921.
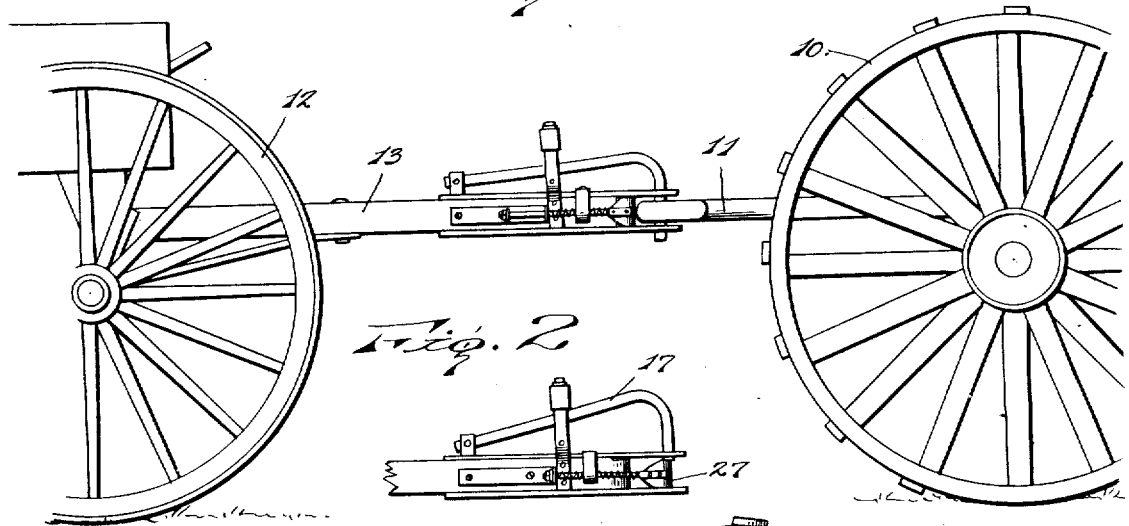
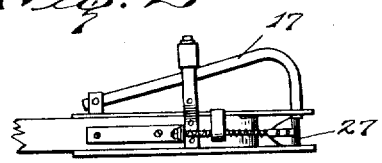
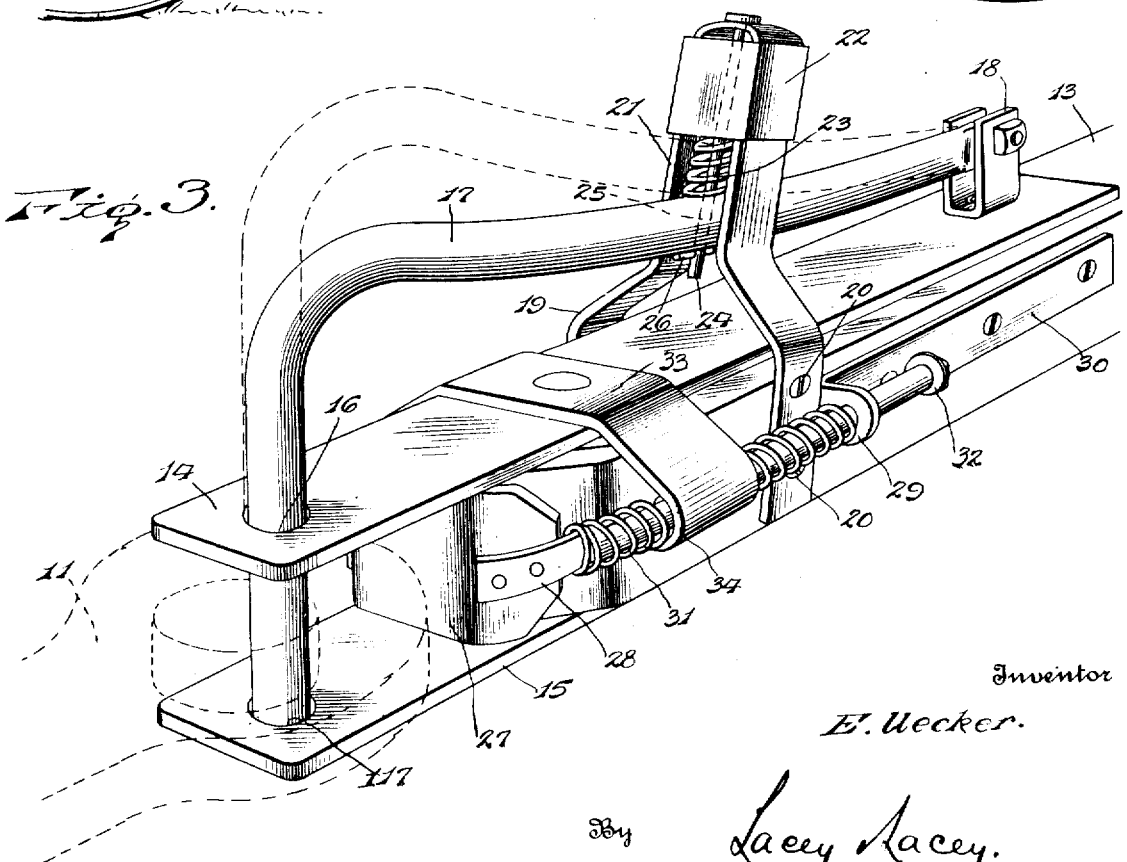
Inventor
E. Uecker.
By Lacey Lacey.
Attorneys Patented Mar. 20, 1923.

1,448,950

UNITED STATES PATENT OFFICE.

ERICH UECKER, OF WETMORE, TEXAS.

AUTOMATIC COUPLING FOR VEHICLES.

Application filed October 15, 1921. Serial No. 507,847.

*To all whom it may concern:*

Be it known that I, ERICH UECKER, a citizen of the United States, residing at Wetmore, in the county of Bexar and State of Texas, have invented certain new and useful Improvements in Automatic Couplings for Vehicles, of which the following is a specification.

The present invention relates to an automatic coupling for vehicles and has for its object to provide a coupling that is easily connected and disconnected, but at the same time holds the two vehicles firmly together.

The device is more particularly intended for use on agriculture implements as for instance the coupling of a plow to a tractor or the like.

In the accompanying drawing one embodiment of the invention is illustrated, and

Figure 1 shows a side view where the coupling is applied to the draft pole or tongue of the trailing, farming tool engaging with the draft eye of a tractor;

Figure 2 shows the coupling in detached position; and

Figure 3 is a perspective view in larger scale of the device.

At the rear end of a tractor 10 is provided a draft eye 11 for engaging with the coupling and the trailing implement 12 has a forwardly extending draft pole or tongue 13 to which the coupling is secured.

As best shown in Figure 3, the coupling consists of an upper and a lower plate 14 and 15 which are bolted or riveted to the end of the tongue 13. These two plates extend beyond the end of the tongue and form jaws for receiving between them the eye 11 of the tractor. Each of the jaws has an aperture 16 and 117 arranged one above the other and intended for receiving the free end of the pintle 17, which is constructed to project slightly below the lower jaw 15 when in engagement. The pintle 17 is of hook shape and hinged at its rear end to a hinge member 18 which is bolted or in any other suitable manner fixed on top of the upper plate 14.

About midway between the two ends of the pintle 17, is provided a yoke 19 straddling the tongue 13 and held rigidly thereon by screws 20. The yoke projects upwardly over the pintle 17 and has two parallel sides 21 connected at the top and forming guides for the sides of the pintle 17. A band 22 is placed around the top of the parallel sides 21 and a compression spring 23 is inserted therein and contacting at its upper and lower ends with the top of the yoke 19 and the upper side of the pintle 17 respectively, so as to continuously exert a pressure in downward direction on the pintle. A pin 24 seated with its head on the outer side of the top of the yoke 19, extends through a perpendicular hole 25 in the pintle 17 and has a cotter pin 26 at its lower end. It will be understood that the function of the pin is to keep the spring in position and also limit the downward motion of the pintle.

Inserted transversely between the jaws or plates 14 and 15 is a slide 27 which has two parallel shanks 28 rigidly secured thereto and running rearwardly along the sides of the tongue 13. The rear ends of the shanks 28 engage in ears 29 formed out of flat, bent plates 30 rigidly secured by rivets or bolts to the tongue 13. Around the shanks and between the ear 29 and the slide 27 are a pair of coil springs 31 tending to push the slide forward over the apertures 16 and 117 and jaws 14 and 15. At the extreme rear ends of the shanks 28 are provided a pair of abutment members 32, here shown as threaded nuts and these nuts are located with regard to the ears 29 in such a position, that, when the nuts 32 abut against the ears 29, the slide stands between the jaws, right over the apertures 16 and 117. In this manner it will be understood that the pintle cannot enter between the jaws and is held in open position by means of the slide 27, upon which it rests with its extreme point.

A guide 33 is secured to the top plate 14 and extends side ways with two arms 34, which are folded over and around the springs 31.

Before the coupling is applied, it has the position shown in Figure 2, with the pintle 17 lifted up and resting on top of the slide 27. When now the tractor and the farming implement are brought together, the draft eye 11 is made to enter between the jaws 14 and 15, when it will push the slide 27 inwardly, thereby releasing the pintle, which, actuated by the compression spring 23, slips down through the aperture 16 the opening in the eye 11 and into the lower aperture 117, thereby securely locking the tongue and the eye together.

All that is necessary, for uncoupling the vehicles, is to lift the pintle 17 upwardly, so as to compress the spring 23 and then draw the vehicles apart, while holding the pintle in this position, when the slide 27 will snap outwardly and obstruct the path of the pintle, which thereupon rests on the slide. The coupling will now remain open and ready to again engage with the draft eye whenever required.

It will readily be understood that instead of having the draft eye on the tractor it may be secured on the tongue, and in such a case the pintle with its housing will be placed on the tractor instead.

When in the claims the word "vehicles" is used, it will be understood to cover not only ordinary vehicles but any tractor or horse drawn vehicle coupled to any other vehicle such as an army limber or agriculture implement such as a plow, harrow, or the like.

Having thus described the invention what is claimed as new is:

1. In an automatic coupling for vehicles, one vehicle having a pintle and the other vehicle a draft eye; an arm to which the pintle is rigidly attached, a mounting for said pintle secured to the draft pole of said first vehicle, hinged connection between said pintle arm and said mounting, a pair of jaws formed on the forward end of said mounting adapted to embrace said draft eye and provided with apertures positioned to engage with the free end of said pintle, a guide for said pintle and means in said guide engaging said arm for holding the pintle in such engagement.

2. In an automatic coupling for vehicles, one vehicle having a pintle and the other vehicle a draft eye; an arm to which the pintle is rigidly attached, a mounting for said pintle secured to the draft pole of said first vehicle, hinged connection between said pintle arm and said mounting, a pair of jaws formed on the forward end of said mounting adapted to embrace said draft eye and provided with apertures positioned to engage with the free end of said pintle, a guide for said pintle arm, means in said guide engaging said arm for holding the pintle in such engagement, a slide between said jaws, guides for said slides, and means for normally holding said slide in the path of the free end of said pintle.

3. In an automatic coupling for vehicles, one vehicle having a pintle and the other vehicle a draft eye; an arm to which the pintle is rigidly attached, a mounting for said pintle secured to the draft pole of said first vehicle, hinged connection between said pintle arm and said mounting, a pair of jaws formed on the forward end of said mounting adapted to embrace said draft eye and provided with apertures positioned to engage with the free end of said pintle, a yoke forming a guide for said pintle arm, a spring in said yoke actuating said pintle arm in the direction of said engagement of the pintle.

4. In an automatic coupling for vehicles, one vehicle having a pintle and the other vehicle a draft eye; an arm to which the pintle is rigidly attached, a mounting for said pintle secured to the draft pole of said first vehicle, hinged connection between said pintle arm and said mounting, a pair of jaws formed on the forward end of said mounting adapted to embrace said draft eye and provided with apertures positioned to engage with the free end of said pintle, a yoke forming a guide for said pintle arm, a spring in said yoke actuating said pintle arm in the direction of said engagement of the pintle, a slide between said jaws, said slide having parallel shanks, bearings for said shanks and springs on the shanks tending to move the slide over said apertures, stops being provided between said bearings and said shanks to limit said movement.

In testimony whereof, I affix my signature.

ERICH UECKER. [L. S.]